United States Patent
Arima

(10) Patent No.: US 7,844,754 B2
(45) Date of Patent: Nov. 30, 2010

(54) DATA TRANSFER APPARATUS AND DATA TRANSFER METHOD

(75) Inventor: Yugo Arima, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 255 days.

(21) Appl. No.: 12/128,067

(22) Filed: May 28, 2008

(65) Prior Publication Data

US 2008/0301329 A1  Dec. 4, 2008

(30) Foreign Application Priority Data

May 29, 2007  (JP)  ............................. 2007-142285

(51) Int. Cl.
  *G06F 13/24*  (2006.01)
  *G06F 13/28*  (2006.01)
(52) U.S. Cl. .......................................... 710/27; 710/22
(58) Field of Classification Search ............... 710/22, 710/27, 46, 48
See application file for complete search history.

(56) References Cited

U.S. PATENT DOCUMENTS

| 5,077,664 | A |   | 12/1991 | Taniai et al. |
|-----------|---|---|---------|---------------|
| 5,252,303 | A | * | 10/1993 | Goof ........................... 422/292 |
| 5,301,287 | A | * | 4/1994  | Herrell et al. ................ 711/202 |
| 5,497,450 | A | * | 3/1996  | Helmbold et al. ........... 358/1.15 |
| 5,535,348 | A | * | 7/1996  | Leach et al. ................. 712/241 |
| 5,717,952 | A |   | 2/1998  | Christiansen et al. |

* cited by examiner

*Primary Examiner*—Henry W Tsai
*Assistant Examiner*—Hyun Nam
(74) *Attorney, Agent, or Firm*—Sprinkle IP Law Group

(57) ABSTRACT

A data transfer apparatus includes a processor, a main memory, and a DMAC connected to the main memory via a plurality of buses. The DMAC transfers data to the main memory by bypassing the processor, writes flag data "1" indicating completion of the data transfer processing in a completion status storage area of the main memory, and finally outputs an interrupt signal to the processor. In response to the interrupt signal, an interrupt handler refers to the completion status storage area, and when the flag data is written, reads the data in the main memory and erases the flag data in the completion status storage area.

8 Claims, 3 Drawing Sheets

DATA TRANSFER APPARATUS AND DATA TRANSFER METHOD

CROSS REFERENCE TO RELATED APPLICATION

This application is based upon and claims the benefit of priority from the prior Japanese Patent Application No. 2007-142285 filed on May 29, 2007; the entire contents of which are incorporated herein by reference.

BACKGROUND OF THE INVENTION

1. Field of the Invention

The present invention relates to a data transfer apparatus and a data transfer method, and more particularly to a data transfer apparatus and a data transfer method that guarantee completion of writing of transferred data to a memory.

2. Description of the Related Art

Technology that transfers data directly between a memory and various devices utilizing a data transfer method such as direct memory access (hereunder, referred to as "DMA") is already in widespread use in various kinds of electronic equipment such as personal computers. A data transfer method such as DMA is a method that transfers data by bypassing a processor such as a central processing unit (hereunder, referred to as "CPU").

For example, in DMA transfer processing, although the transfer of data is performed by bypassing the CPU, there is a problem that the load of the CPU with respect to settings processing for a DMA controller (hereunder, referred to as "DMAC") and the like increases. To solve this problem, technology has been disclosed in which, when a CPU instructs a DMAC to execute data transfer processing, after transferring the data and completing the data transfer operation, the DMAC sets a completion status that indicates completion of the data transfer in a status register (for example, see Japanese Patent Laid-Open No. 2005-78596).

According to the aforementioned technology, by monitoring whether or not a completion status is written after instructing the DMAC to execute data transfer processing, the CPU can recognize that the data transfer processing is completed and execute processing in accordance with that completion.

However, in the technology relating to that disclosure, there is the problem that since the CPU must constantly monitor whether or not the completion status is written after issuing a data transfer instruction to the DMAC, the overheads for that monitoring are large.

Further, in recent years computer architecture having a plurality of buses, such as PC architecture having a so-called "Northbridge" and "Southbridge", has also been brought into practical use.

For example, in systems having a processor, a companion chip, and a system memory, there are cases in which mutual accesses are performed through a plurality of buses. Therefore, for example, even when three types of processing consisting of an access to the system memory from a DMA controller inside the companion chip, an interrupt notification to the processor from a DMA controller inside the companion chip, and an access to the system memory from the processor are started in that order, in some cases the order of the actual access processing between the three components is not guaranteed.

Accordingly, normally after a DMA controller inside a companion chip performs an operation to transfer data to the system memory, the DMA controller sends an interrupt to the processor to notify the processor that the data transfer is completed. Thereafter, the processor detects the interrupt and accesses the system memory to read the transfer data. However, in this kind of system, since each access extends over a plurality of buses, a time lag arises between the time the DMA controller executes the operation to transfer data to the system memory and the time that transfer of the data to the system memory is actually completed, and there is the possibility that the processor may attempt to read the data before the data is actually transferred to the system memory.

In this kind of system, even if the system applies the technology according to the above described disclosure, a similar problem can arise.

SUMMARY OF THE INVENTION

According to one aspect of the present invention there can be provided a data transfer apparatus having: a processor; a memory connected to the processor; a data transfer unit that is connected to the memory through a plurality of buses and is configured to perform data transfer processing to transfer data to be transferred from a device having the data to be transferred to a first storage area of the memory by bypassing the processor, and when the data transfer processing finishes, write status data indicating completion of the data transfer processing in a second storage area of the memory, and output a predetermined interrupt signal to the processor after writing the status data; and a transfer data readout processing unit configured to refer to the second storage area in response to the predetermined interrupt signal sent to the processor and perform determination processing that determines whether or not the status data is written, repeat the reference to the second storage area when a result of the determination processing indicates that the status data is not written, and read out the data to be transferred in the first storage area and erase the status data in the second storage area when the status data is written.

DETAILED DESCRIPTION OF THE PREFERRED EMBODIMENTS

Hereunder, an embodiment of the present invention is described with reference to the drawings.

Figure 1:
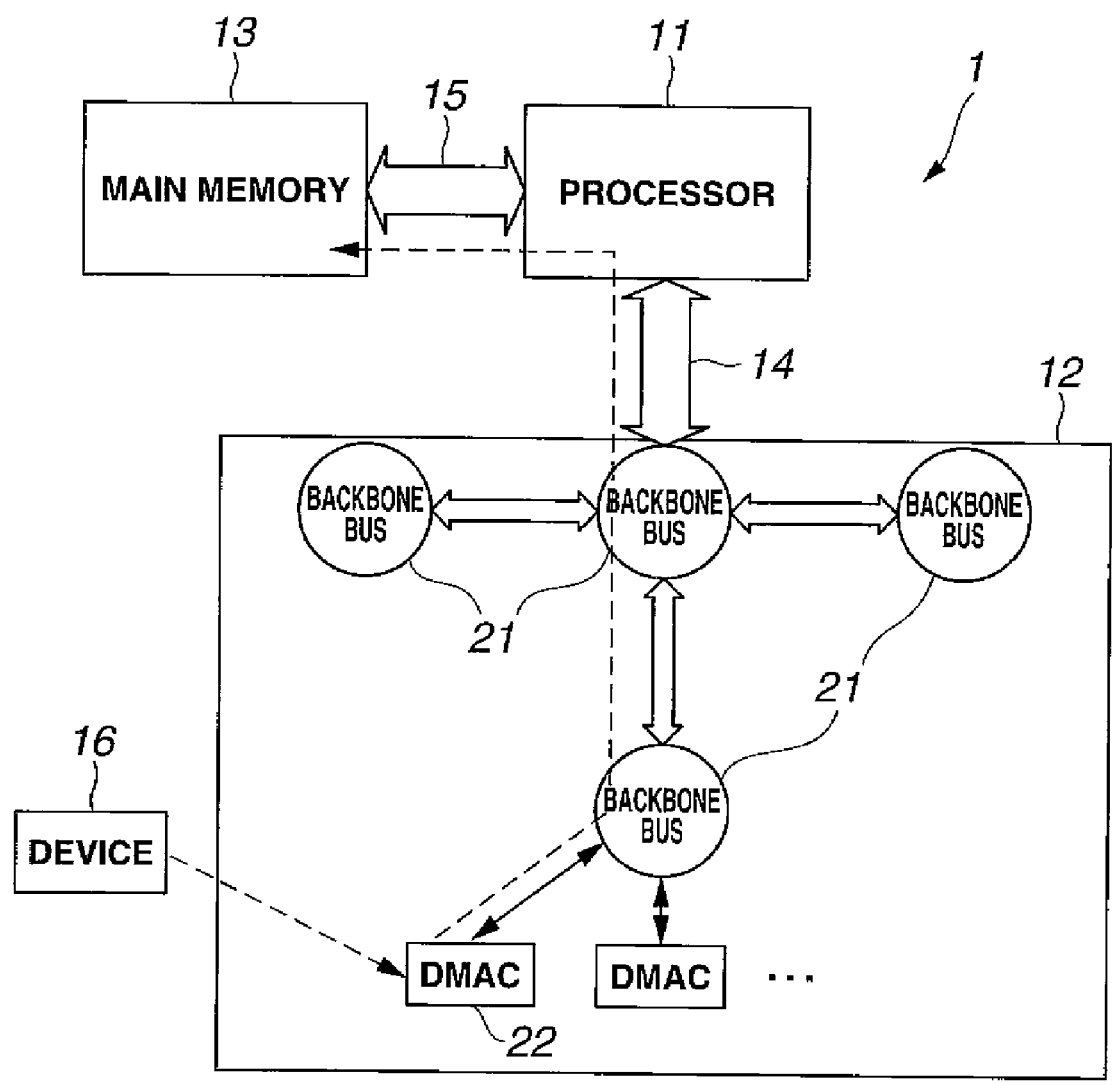
FIG. 1 is a block diagram that illustrates the configuration of a data transfer apparatus according to one embodiment of the present invention.

First, the configuration of the system according to the present embodiment is described based on FIG. 1. FIG. 1 is a block diagram showing the configuration of a data transfer apparatus according to the present embodiment.

As shown in FIG. 1, a data transfer apparatus 1 includes a processor 11 such as a CPU, a companion chip 12, and a system memory, i.e., a main memory 13. The processor 11 and the companion chip 12 are connected via a bus 14. The processor 11 and the main memory 13 are connected via a bus 15.

The companion chip 12 internally includes one or more DMACs. The companion chip 12 is connected to the processor 11 via a plurality of buses 21 (in this case, backbone buses).

The companion chip 12 has a plurality of interfaces (not shown) for connecting with various devices such as a hard disk device. The plurality of interfaces are connected to the processor 11 through the plurality of backbone buses 21.

The data transfer apparatus 1 is configured to be capable of executing data transfers by DMA between the main memory 13 and various devices by using a DMAC and bypassing the processor 11, i.e., without relying on transfer control by the processor 11. In FIG. 1, one DMAC 22 among a plurality of DMACs is accessibly connected to an external device 16. As shown by the dotted line, the DMAC 22 executes transfer processing that reads out data to be transferred that is possessed by the device 16 and transfers the data to a predetermined recording region of the main memory 13 by DMA.

The data transfer apparatus 1 may be, for example, a personal computer (PC) having PC architecture. In that case, the processor 11 is connected to the main memory 13 through a Northbridge chip (not illustrated), and the companion chip 12 is a Southbridge chip.

Figure 2:
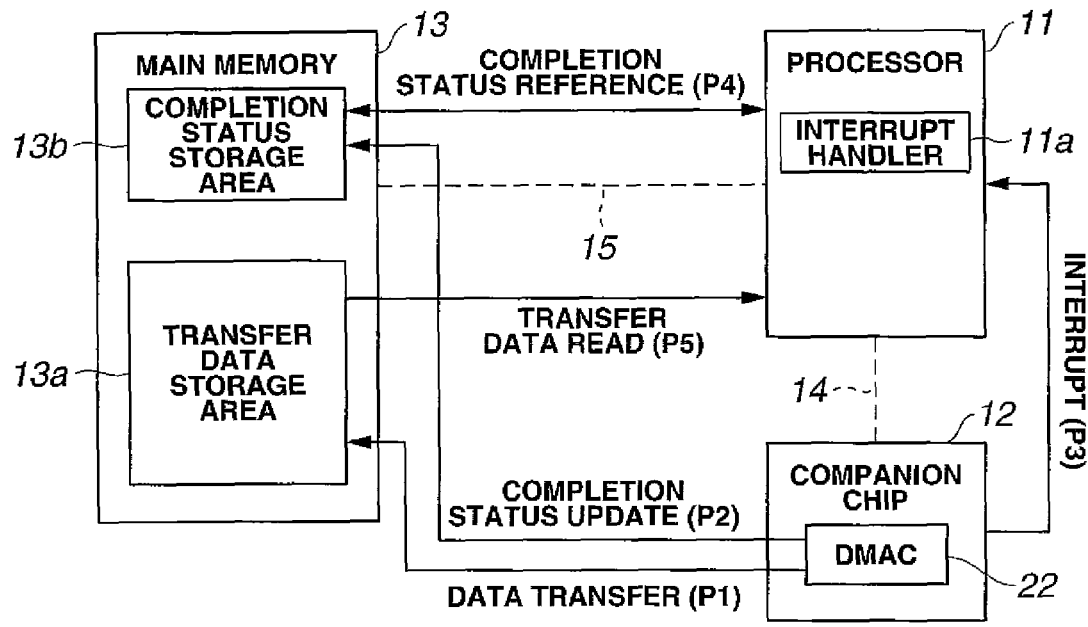
FIG. 2 is a view for describing the flow of data between a processor, a main memory, and a DMAC according to the embodiment of the present invention.
Figure 3:
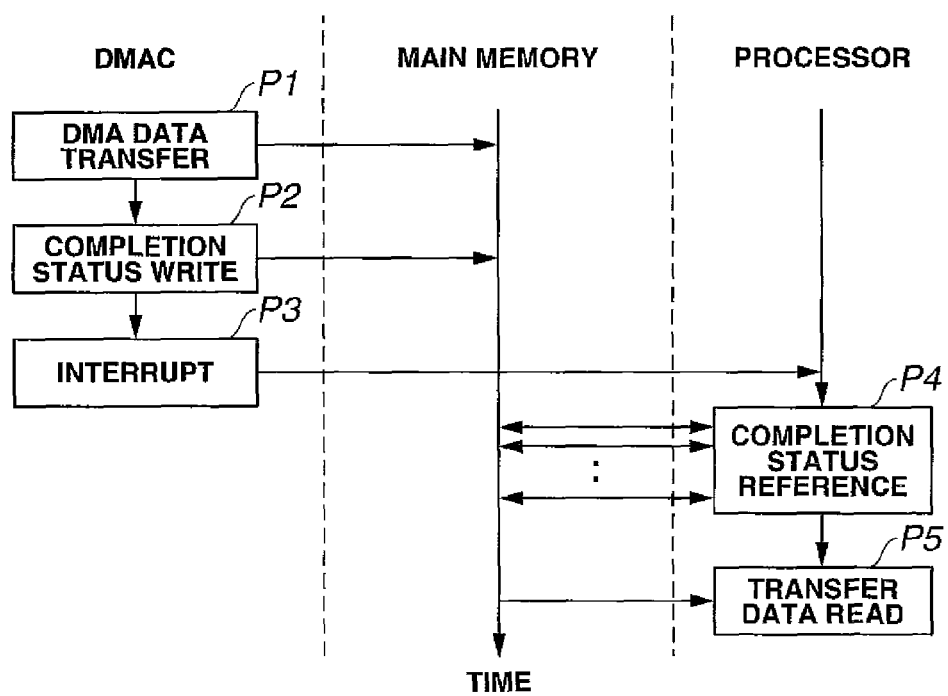
FIG. 3 is a sequence diagram for describing an example of the flow of sending and receiving data between the processor, the main memory, and the DMAC together with the passage of time according to the embodiment of the present invention.

Next, data transfer processing by DMA is described using FIG. 2 and FIG. 3. FIG. 2 is a view for describing the flow of data between the processor 11, the main memory 13, and the DMAC 22. FIG. 3 is a sequence diagram for describing an example of the flow of sending and receiving data between the processor 11, the main memory 13, and the DMAC 22 together with the passage of time. Here, a case is described in which the DMAC 22 reads out data to be transferred from the external device 16 and transfers the data to a predetermined storage area 13a of the main memory 13 by DMA.

As shown in FIG. 2, the DMAC 22 of the companion chip 12 reads out transfer data from the device 16 and transfers the read-out transfer data to the main memory 13 by DMA (P1 in FIG. 3). Although the transfer data that is read out from the device 16 is transferred to the main memory 13, the transfer data is transferred by the DMAC 22 to the predetermined transfer data storage area 13a of the main memory 13 via a plurality of backbone buses 21 inside the companion chip 12 and an internal bus inside the processor 11 without utilizing transfer control by the processor 11.

Upon completing the transfer processing of the transfer data, the DMAC 22 writes flag data (P2 in FIG. 3) as status data (hereunder, referred to as "completion status data") that indicates completion of the data transfer in a predetermined storage area (hereunder, referred to as "completion status storage area 13b") that is different to the transfer data storage area 13a inside the main memory 13. More specifically, in this case, flag data "1" is written in the completion status storage area 13b. The flag data "1" is status data indicating the completion of data transfer processing that is sent to the main memory 13 from the DMAC 22 via the plurality of backbone buses 21 inside the companion chip 12, and written in the completion status storage area 13b.

After writing the flag data in the completion status storage area 13b, the DMAC 22 then outputs a predetermined interrupt signal to the processor 11 (P3 in FIG. 3).

When the processor 11 receives the interrupt signal, an interrupt handler 11a that is an interrupt processing program corresponding to the interrupt signal refers to the data stored in the completion status storage area 13b of the main memory 13 (P4 of FIG. 3). This reference is performed, for example, by polling the completion status storage area 13b. The interrupt handler 11a refers to the flag data stored in the completion status storage area 13b to determine whether or not the flag data is "1". The interrupt handler 11a constitutes a transfer data readout processing unit.

The interrupt handler 11a of the processor 11 refers to, i.e. monitors, the completion status storage area 13b until the flag data stored in the completion status storage area 13b is "1". This is because, since the flag data, similarly to the transfer data, is written, following a path that includes a plurality of backbone buses 21, it can be assumed that transfer of the transfer data is completed based on the fact that the flag data is "1".

When the flag data is "1", the processor 11 reads in the transfer data from the transfer data storage area 13a of the main memory 13 (P5 in FIG. 3).

Figure 4:
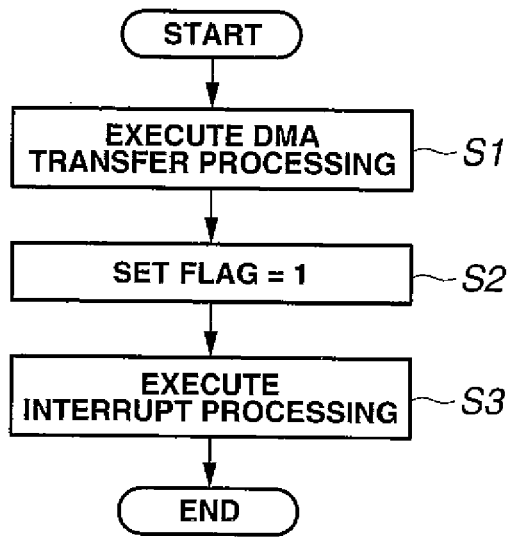
FIG. 4 is a flowchart illustrating an example of the flow of transfer processing of the DMAC according to the embodiment of the present invention.

FIG. 4 is a flowchart that illustrates an example of the flow of transfer processing of the DMAC.

As shown in FIG. 4, when execution of a DMA transfer is instructed, first the DMAC 22 executes DMA transfer processing that carries out DMA transfer for data to be transferred, to transfer the data from a designated address of the device 16 to a designated address of the transfer data storage area 13a of the main memory 13 (step S1).

When transfer processing of the DMAC 22 is completed, the DMAC 22 executes completion status data write processing that sets flag data as completion status data to "1" (step S2). The flag data "1" is written in the completion status storage area 13b of the main memory 13 as described above.

When writing of the flag data is finished, the DMAC 22 outputs to the processor 11 a predetermined interrupt signal to notify the processor 11 that the data transfer processing is completed (step S3).

Figure 5:
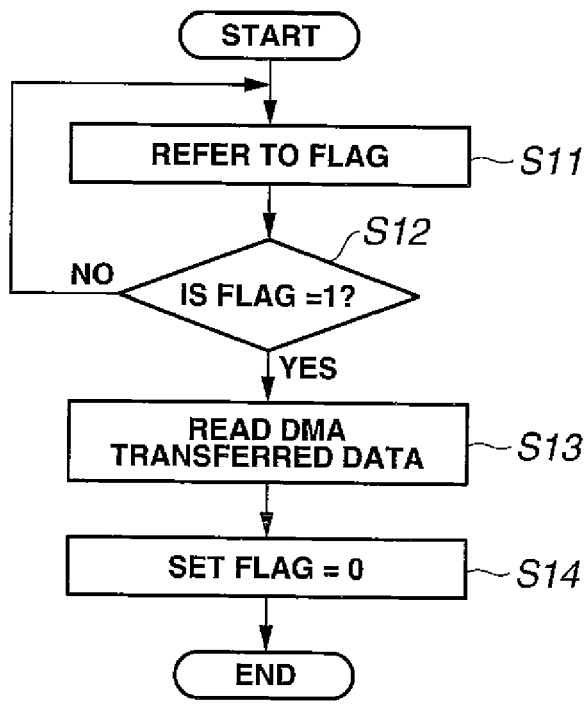
FIG. 5 is a flowchart illustrating an example of the flow of read-in processing of transfer data executed by an interrupt handler according to the embodiment of the present invention.

FIG. 5 is a flowchart that illustrates one example of the flow of read-in processing of transfer data by the interrupt handler 11a.

Upon receiving an interrupt signal as a notification that data transfer processing is completed from the DMAC 22, the interrupt handler 11a as a transfer data readout processing unit first refers to the flag data (step S11). The interrupt handler 11a determines whether the flag data that is referred to and read is "1" (step S12).

When the referred to flag data is not "1", the result at step S12 is No, and thus the interrupt handler 11a repeats the processing of step S11. When the referred to flag data is "1", the result at step S12 is Yes, and the interrupt handler 11a then reads in the transfer data from the transfer data storage area 13a of the main memory 13 (step S13). When there is no flag data "1" at the time of referring, the transfer data from the transfer data storage area 13a of the main memory 13 is not read in.

Finally, the interrupt handler 11a executes rewriting processing of the flag data of the completion status storage area 13b to "0", that is, erasing processing of the flag data (step S14).

As described above, according to the present embodiment, first the DMAC 22 inside the companion chip 12 asynchronously transfers transfer data by DMA to the main memory 13. After the data transfer finishes, the DMAC 22 updates predefined completion status data at an address of a different storage area of the main memory 13. After updating the completion status, the DMAC 22 sends an interrupt to the processor 11. The interrupt handler 11a that is the transfer data readout processing unit of the processor 11 that detects the interrupt signal refers to the completion status data of the main memory 13. After waiting for updating of the completion status data, the interrupt handler 11a reads in the transfer data from the main memory 13.

Thus, by guaranteeing the order for executing processing to write transfer data and processing to write completion status data in processing to write transfer data from the DMAC 22 to the main memory 13, reliable readout processing from the main memory 13 is assured at the processor 11 with respect to transfer data that is transferred by DMA.

Accordingly, since the processor 11 refers to the completion status upon receiving an interrupt signal without the necessity of constantly referring to the completion status, it is possible to reduce the load of the processor 11 and prevent the processor 11 from reading the transfer data before the DMAC 22 completes writing of the transfer data in the main memory 13.

As described above, according to the data transfer apparatus of the present embodiment, when a data transfer to the memory is performed via the plurality of buses by bypassing the processor, that is, without relying on transfer control by the processor 11, it is possible to guarantee that the transfer to the memory of data to be read in from the memory by the processor is completed.

It is to be understood that all or a part of a program which executes the operations described above can be recorded on a portable medium such as a flexible disk or a CD-ROM or a storage device such as a hard disk. Alternatively, the program can be implemented as a program product on which all or a part of the program is recorded. The program is read by a computer and all or a part of the operations are executed by the computer. Alternatively, all or a part of the program can be provided or distributed via a communication network. A user can easily implement the data transfer method according to the present invention by downloading the program via a communication network and installing the program in a computer or by installing the program from a recording medium.

The present invention is not limited to the above described embodiment, and various variations and modifications can be made thereto without departing from the spirit and scope of the present invention.

What is claimed is:

1. A data transfer apparatus, comprising:
   a processor;
   a memory as a main memory connected to the processor;
   a data transfer unit that is a direct memory access controller connected to the memory through a plurality of buses and is configured to perform data transfer processing to transfer data to be transferred from a device having the data to be transferred to a first storage area of the memory by bypassing the processor, and when the data transfer processing finishes, write status data indicating completion of the data transfer processing in a second storage area of the memory, and output a predetermined interrupt signal to the processor after writing the status data; and
   a transfer data readout processing unit that is an interrupt processing program provided in the processor, the transfer data readout processing unit being configured to refer to the second storage area in response to the predetermined interrupt signal sent to the processor and perform determination processing that determines whether or not the status data is written, repeat the reference to the second storage area when a result of the determination processing indicates that the status data is not written, and read out the data to be transferred in the first storage area and erase the status data in the second storage area when the status data is written.

2. The data transfer apparatus according to claim 1, wherein the transfer data readout processing unit refers to the second storage area by polling the second storage area.

3. The data transfer apparatus according to claim 1, wherein the transfer data readout processing unit refers to the second storage area by polling the second storage area.

4. A data transfer method that transfers data to a memory as a main memory connected to a processor from a data transfer unit that is connected to the memory via a plurality of buses, comprising:
   the data transfer unit is a direct memory access controller performing data transfer processing that transfers data to be transferred from a device having the data to be transferred to a first storage area of the memory by bypassing the processor, the processor having an interrupt handler;
   upon completion of the data transfer processing, the data transfer unit writing status data indicating completion of the data transfer processing in a second storage area of the memory;
   the data transfer unit outputting a predetermined interrupt signal to the processor after writing the status data; and
   referring to the second storage area in response to the predetermined interrupt signal to the processor, the processor performing determination processing that determines whether or not the status data is written, repeatedly referring to the second storage area when a result of the determination processing is that the status data is not written, and reading out the data to be transferred in the first storage area and erasing the status data in the second storage area when the status data is written.

5. The data transfer method according to claim 4, wherein the reference is performed by polling the second storage area.

6. A computer having PC architecture, comprising
   a processor;
   a main memory connected to the processor;
   a direct memory access controller that is connected to the main memory through a plurality of buses and is configured to perform data transfer processing to transfer data to be transferred from a device having the data to be transferred to a transfer data storage area of the main memory by direct memory access that bypasses the processor, and when the data transfer processing finishes, write status data indicating completion of the data transfer processing in a completion status storage area of the main memory, and output a predetermined interrupt signal to the processor after writing the status data; and
   an interrupt handler included in the processor, the interrupt handler being configured to refer to the completion status storage area in response to the predetermined interrupt signal sent to the processor and perform processing that determines whether or not the status data is written, repeat the reference to the completion status storage area when the determination processing result indicates that the status data is not written, and read out the data to be transferred in the transfer data storage area and erase the status data in the completion status storage area when the status data is written.

7. The computer having PC architecture according to claim 6, wherein the direct memory access controller is included in a companion chip that is separate from the processor.

8. The computer having PC architecture according to claim 6, wherein the interrupt handler refers to the completion status storage area by polling the completion status storage area.

* * * * *